United States Patent [19]

Schukei et al.

[11] 4,292,132

[45] Sep. 29, 1981

[54] HYDRAULICALLY CENTERED CONTROL ROD

[75] Inventors: Glen E. Schukei, South Windsor; Walter R. Horlacher, III, Simsbury; William T. Sampson, Windsor Locks, all of Conn.

[73] Assignee: Combustion Engineering, Inc., Windsor, Conn.

[21] Appl. No.: 55

[22] Filed: Jan. 2, 1979

[51] Int. Cl.³ .............................................. G21C 7/16
[52] U.S. Cl. .................. 176/36 S; 176/86 R
[58] Field of Search ............. 176/36 R, 368 A, 86 R, 176/38, 19 R

[56] References Cited

U.S. PATENT DOCUMENTS

| | | | |
|---|---|---|---|
| 3,122,045 | 2/1964 | Zilberfarb | 176/36 R |
| 3,237,150 | 2/1966 | Beck et al. | 176/19 R |
| 3,562,109 | 2/1971 | Bezold et al. | 176/368 A |
| 3,640,845 | 2/1972 | Ripley | 176/36 R |
| 3,728,218 | 4/1973 | Gnutzmann et al. | 176/86 R |
| 3,855,060 | 12/1974 | Dietrich et al. | 176/36 S |
| 3,979,258 | 9/1976 | Schweiger et al. | 176/36 R |

FOREIGN PATENT DOCUMENTS 52-6895  1/1977  Japan .................. 176/36 R

Primary Examiner—S. A. Cangialosi
Attorney, Agent, or Firm—L. James Ristas

[57] ABSTRACT

A control rod suspended to reciprocate in a guide tube of a nuclear fuel assembly has a hydraulic bearing formed at its lower tip. The bearing includes a plurality of discrete pockets on its outer surface into which a flow of liquid is continuously provided. In one embodiment the flow is induced by the pressure head in a downward facing chamber at the end of the bearing. In another embodiment the flow originates outside the guide tube. In both embodiments the flow into the pockets produces pressure differences across the bearing which counteract forces tending to drive the rod against the guide tube wall. Thus contact of the rod against the guide tube is avoided.

16 Claims, 5 Drawing Figures

HYDRAULICALLY CENTERED CONTROL ROD

BACKGROUND OF THE INVENTION

This invention relates to nuclear reactors having control rods reciprocable from above into a reactor core, and in particular to control rods reciprocable in guide tubes having a liquid flowing upward within the tube.

In a typical nuclear reactor the core is composed of a plurality of elongated fuel assemblies each containing a plurality of elongated fuel elements. A liquid coolant is pumped upward through the core in order to extract the generated heat for the production of useful work. The heat output of the core is usually regulated by the movement of control rods containing neutron absorbing material such as $B_4C$. In reactors of the pressurized water type, each fuel assembly typically includes a plurality of cylindrical guide tubes through which cylindrical control rods are reciprocated. Some of the coolant flow is usually diverted into the lower end of the guide tube in order to cool the control rod, which generates heat in the nuclear transformation associated with its neutron absorbing function.

During typical power operation, most of the regulating control rods are maintained in a unique withdrawn position in which the lower tip of the control rod is within the guide tube and adjacent to the fuel elements at the upper end of the assembly. For reasons that are not understood fully significant wear has been found on the inside surfaces of the guide tubes at precisely the elevation corresponding to the tip of the control rod in the withdrawn position. Flow tests on a laboratory model of the guide tube and control rod indicate that flow induced vibration of the rod results in an oscillatory contact of the rod tip against the guide tube wall.

SUMMARY OF THE INVENTION

The present invention provides a hydraulic bearing at the tip of the control rod such that, whenever the tip is caused to move near the guide tube inner wall, restoring forces automatically prevent contact of the tip with the wall. Thus, guide tube wear is essentially eliminated even though no attempt is made to abate the driving forces giving rise to the vibration.

The invention provides a plurality of discrete pockets circumferentially spaced around the outer surface of the rod tip, and means for introducing a portion of the liquid being pumped through the core into each of the pockets at substantially equal flow. As the vibrational forces acting on the rod move the tip toward a surface on the guide tube inner wall, the nearest pocket approaches the tube and nearly seals against it. The liquid introduced into this first pocket is thus restricted from leaving it and so increases the static pressure in the pocket and particularly on the front wall of the pocket. The pressure on the front wall of the diametrically opposite, or second pocket is at the same time decreased because the flow area available to empty this pocket is now larger due to the displacement of the rod away from its mating wall. The net effect is a static pressure difference across the rod tip which attempts to move the tip off the guide tube wall and to the guide tube center. Even with strong vibrating forces acting on the rod, the tip will not contact the guide tube since the closer the tip comes to the tube, the more effective the seal between the pocket and the tube.

In one embodiment of the invention, the means for introducing the pumped liquid into the pocket includes a downward facing chamber at the rod tip for trapping some of the liquid flowing upward through the tube, and bores between the chamber and each pocket for supplying liquid to each pocket at the constant pressure developed in the chamber. In another embodiment, the liquid is introduced into the pockets through a plurality of holes in the guide tube opposite each pocket. In both embodiments, advantage is taken of relatively high pressure liquid existing in conventional fuel assembly designs so that no added structure is required for obtaining the suitable source of higher pressure liquid.

It should be understood that one of the objectives of the present invention is to prevent the control rod tip from contacting the guide tube wall. This result must be accomplished without significantly reducing the time required for the control rod to "sham", or drop by gravity fully into the core in response to an emergency. This requirement greatly restricts the use of snubber-type devices between the rod and the guide tube.

BRIEF DESCRIPTION OF THE DRAWINGS

The invention is more fully described in the accompanying text and drawings in which.

DESCRIPTION OF THE PREFERRED EMBODIMENT

Figure 1:
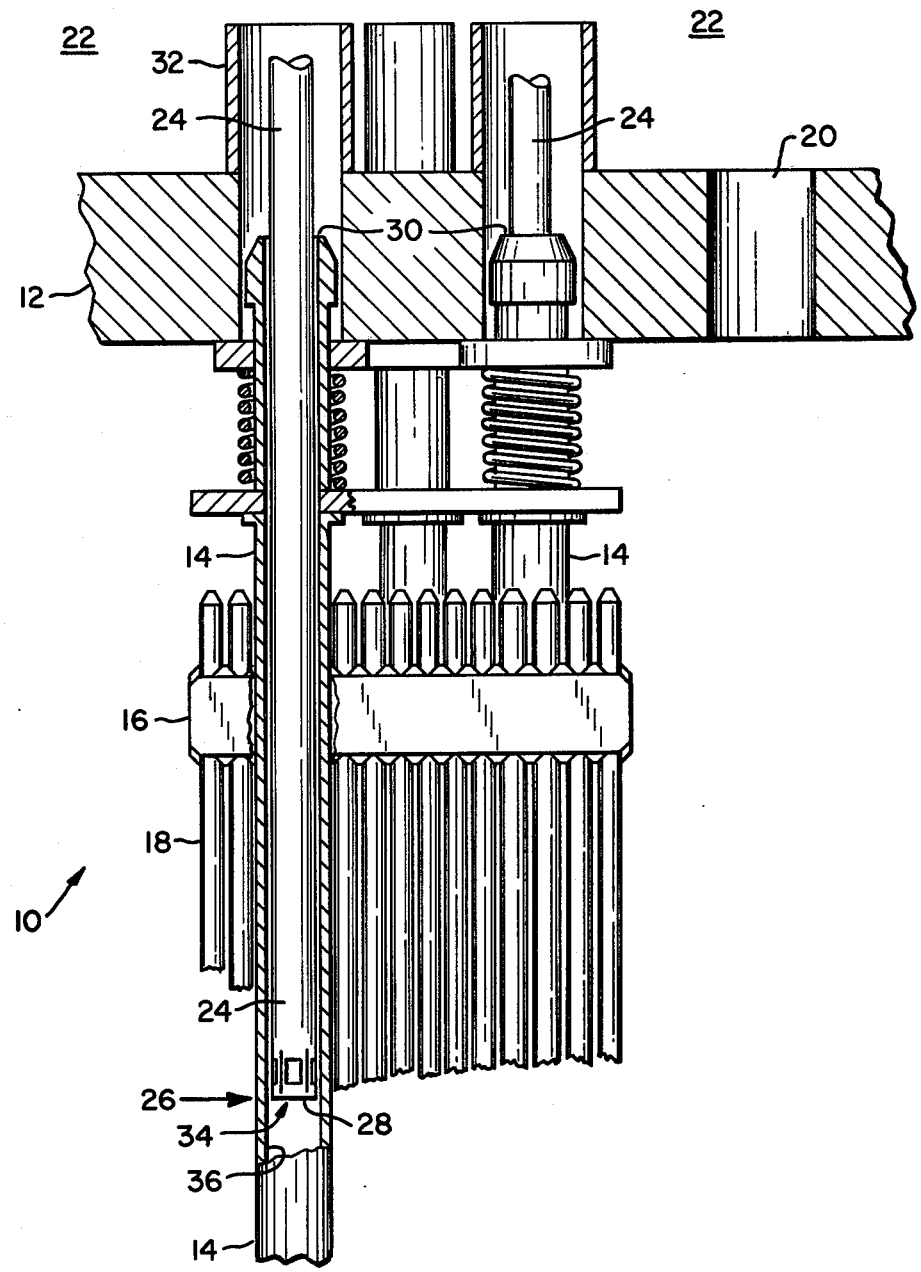
FIG. 1 is a partially sectioned elevation view of the upper end of a nuclear fuel assembly having the inventive control rod suspended therein.

FIG. 1 shows the upper portion of a fuel assembly 10 held in place at the top by a fuel assembly alignment plate 12 and at the bottom by a lower fuel support plate (not shown). The assembly 10 includes a plurality of guide tubes 14 extending from the alignment plate 12 to the lower support plate, and a plurality of axially spaced grids 16 connected to the guide tubes 14. The grids 16 define a matrix of support springs (not shown) for spacing and supporting a plurality of fuel elements 18 associated with the assembly 10. In a typical modern reactor, the core consists of over 200 closely spaced fuel assemblies 10. Nuclear fission occurs within the fuel elements 18, generating heat to be transferred to the reactor coolant. In most reactors, the coolant is pressurized water pumped into the lower end of the core and up through the fuel assemblies 10, where the water is substantially heated. This heated water leaves the reactor core through openings 20 in the alignment plate 12, and enters a plenum 22 from which it is directed to a heat exchanger (not shown).

The power level of the reactor is usually regulated by the insertion and withdrawal of control rods 24. In modern pressurized water reactors, each fuel assembly 10 has guide tubes 14 adapted to receive a control rod 24 over the entire length of the assembly 10. The control rod 24 is rigidly connected at its upper end to a drive mechanism (not shown) and, because it is very elongated (14 feet long and less than 1 inch in diameter), the rod 24 is often not precisely centered within the guide tube 14. This is particularly true when the control rods 24 is in the withdrawn position 26 as shown in FIG. 1. When the rod 24 is in the fully withdrawn position 26, the rod tip 28 is still within the guide tube 14 and typically extends downward into the upper portion of the fuel matrix 18. Thus, most control rods 24 are maintained in a unique withdrawn position 26 relative to the guide tube 14 such that the control rod tips 28 are opposite a particular surface of the guide tube inner wall 36.

When the control rod 24 is more fully inserted into the reactor core for absorbing neutrons, it will generate heat. Provision must be made for cooling the control rod 24 to prevent the poison material contained therein from melting. Typically, the lower portion of the guide tube 14 has openings (not shown) whereby some of the pumped coolant entering the bottom of the fuel assembly 10 is diverted into the guide tube 14 and flows upward therein over the control rod 24, through the guide tube exit 30 and upward through shroud tubes 32 to be deposited in the upper portion of the reactor vessel (not shown). As was described above, inspection of fuel assemblies 10 removed from operating nuclear reactors has shown patterns of wear on the inner surface of the guide tubes 14 containing control rods 24 at precisely the positions 26 corresponding to the elevation of the control rod tip 28 when the control rod 24 is in the unique withdrawn position.

Figure 2:
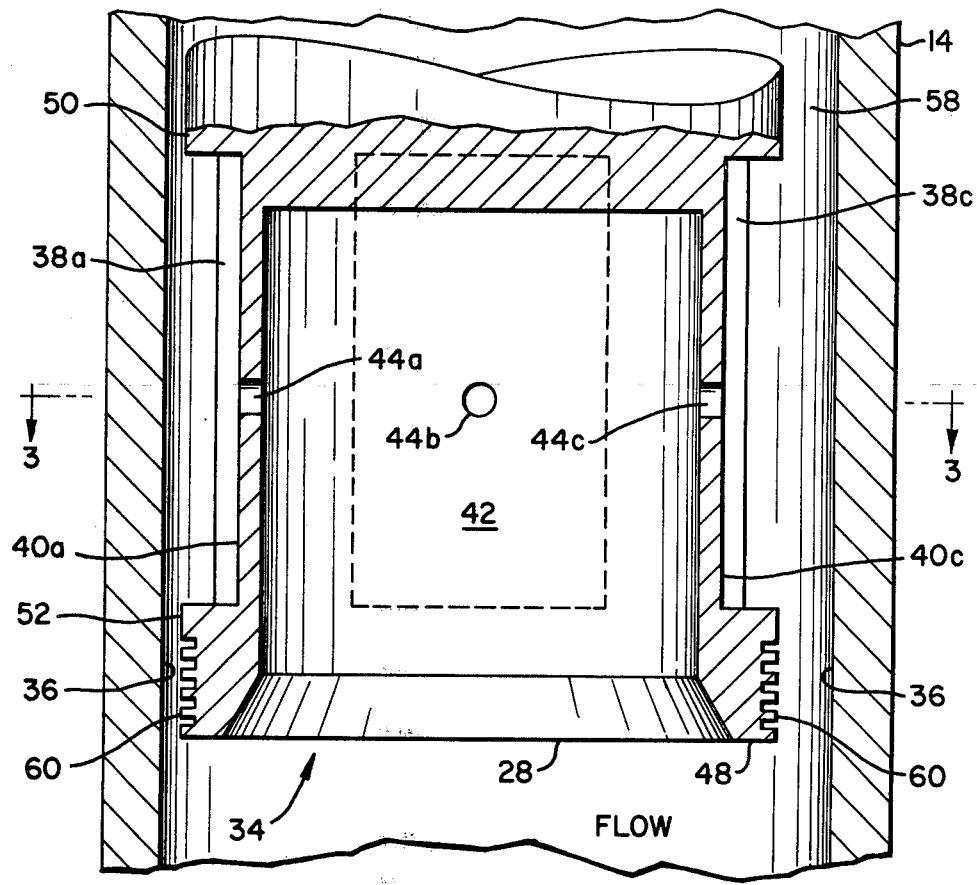
FIG. 2 is a sectioned elevation view of the invention.
Figure 3:
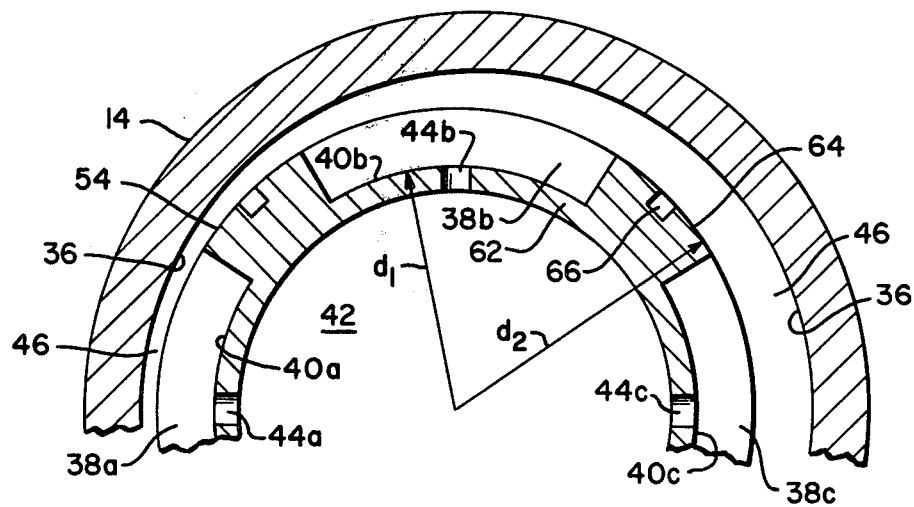
FIG. 3 is a sectioned view along the lines 3—3 of FIG. 2.

FIGS. 2 and 3 show one embodiment of the invention in which the control rod tip 28 is formed into a hydraulic bearing 34 which has been found effective in preventing contact of the rod tip against the guide tube inner wall 36. The bearing 34 has a plurality of discrete pockets 38a, 38b, 38c spaced around the circumference of the rod tip 28, each pocket having a respective front wall 40a, 40b, 40c facing the guide tube inner wall 36. The bearing 34 also has a downward facing chamber 42 which is fluidly connected to each pocket 38a-c by respective orifices 44a, 44b, and 44c. As cooling liquid flows up the guide tube 14 at a relatively low velocity it enters the chamber 42 and passes through orifices 44 into pockets 38. Some of the flow passes through the annulus 46 between the tube 14 and the ring 48 formed at the end of the tip 28.

Because of the hydraulic forces acting on the control rod 24, the rod tends to move towards the guide tube wall 36. As shown in FIGS. 2 and 3, it may be assumed that the rod tip 28 is closer to the left side of the tube and therefore pocket 38a is closer to the tube wall than is pocket 38c. If the rod tip 28 contacts the guide tube wall 36, the surfaces 50 and 52 above and below the pocket 38a, and surfaces 54 azimuthally on either side of pocket 38a, touch the guide tube wall 36 and completely seal the space within pocket 38a. At the same time, the diametrically opposite pocket 38c is moving farther from its respective guide tube wall 36. In this condition, the pressure drop between the chamber 42 and the guide tube wall is almost entirely taken at points 50 and 52 at the outer edges of pocket 38a with essentially no pressure drop across orifice 44a due to the tight restriction at points 50 and 52 causing the flowing out of pocket 38a to approach zero. Thus the static pressure on the front wall 40a is approximately equal to the pressure head developed in the chamber 42.

Although the pressure drop between the chamber 42 and the space 58 between the rod 24 and the guide tube wall 36 above pocket 38c is about the same as the pressure drop between the chamber 42 and point 50, nearly all of this drop is taken across the orifice 44c since the flow resistance of area 58 between the pocket 38c and the higher portion of the rod 24 is very small compared to that of the orifice 44c. Accordingly, the static pressure acting radially inward on the front wall 40c of pocket 38c is much less than the static pressure on front wall 40a.

This difference in static pressure between front walls 40a and 40c produces a net force from left to right in FIGS. 2 and 3 tending to keep the rod tip 28 away from guide tube wall 36. It is to be understood that, with the present invention, the rod tip 28 does not actually touch the guide tube wall 36 at points 50, 52, and 54. But the surfaces around the pocket should conform to the curvature of the guide tube inner wall 36 in order to provide the best seal in the theoretically limiting condition of actual contact. Although a perfect seal around pocket 38a is not accomplished, the tip 28 does come close enough to the wall 36 so that sufficient static pressure is generated against the pocket front wall 40a to move the rod tip 28 away from the guide tube wall 36 before actual contact is made.

Further to enhance this effect, it will be remembered that the flow through the guide tube 14 is at a relatively low velocity. Because of the reduced flow area available in the annulus 46 between the rod tip 28 and the guide tube walls 36, the velocity of the fluid in the annulus 46 will be higher then in the unobstructed guide tube 14. This high velocity will result in a lower static pressure in the annulus 46 than in the guide tube 14. To further increase the effectiveness of the invention, labyrinth seals 60 may be formed in the ring portion 48 of the bearing 34 to add resistance to the upward flow in the annulus 46 and therefore increase the flow through the chamber 42 and orifices 44. This tends to increase the pressure which can be generated against the pocket front walls 40 because it increases the pressure drop between orifice 44 and points 50, 58. This drop is the source of the restoring force.

In the preferred embodiment, the pockets 38 are formed around the outer surface of the bearing 34 such that the azimuthal perimeter of the bearing 34 is defined by integrally formed, alternating segments 62, 64 having respectively smaller and larger outer diameters $d_1$ and $d_2$ wherein the pockets 38 consist of the space between the segments 64. The particular shape of the pockets 38 is a parameter that can be optimized by the designer. The cross-sectional area of the front wall 40 facing the guide tube wall 36 should, of course, be larger than the cross section of the orifices 44 so that advantage can be taken in pocket 38a of a high pressure in the pocket acting on a large cross section of the front wall, 44a a small orifice 44c will assure that the entire pressure drop between the chamber 42 and point 58 will be taken across the orifice 44c as required for proper operation of the invention. It is usually easiest to contour the front wall 40 of each pocket 38 to be concentric with the outer diameter of the control rod 24, which in the preferred embodiment also has an outer diameter of $d_2$. In order to assure adequate liquid flow to the side of the control rod 24 that might be expected to remain very close to, but not touch, the wall 36 even when the invention is used, bypass flow grooves 66 may be provided in the larger diameter segments 64. These grooves 66 extend between elevations represented by points 50 and 52 and run longitudinally parallel to the pockets so that some of the flow will rise along the control rod, even when it is very close to wall 36.

Although a variety of modifications to the bearing may be made without departing from the scope of the invention, the following dimensions characterize a variation of the above-described embodiment that was found to be effective in eliminating vibrational contact in a flow visualization test performed at conditions substantially representing those of a typical pressurized water reactor. The guide tube 14 inner diameter was 0.960 inches, the control rod 24 and bearing 34 outer diameter $d_2$ was 0.900 inches, and each orifice 44 diameter was 0.185 inches. The height of the ring portion 48 was 0.25 inches, the height of the pockets 38 was 1.0 inch, and the overall height of the bearing 34 was 1.5 inches. The chamber 42 diameter was 0.5 inches, and the orifices 44 were located 1.135 inches from the lower edge of the tip 28.

Figure 4:
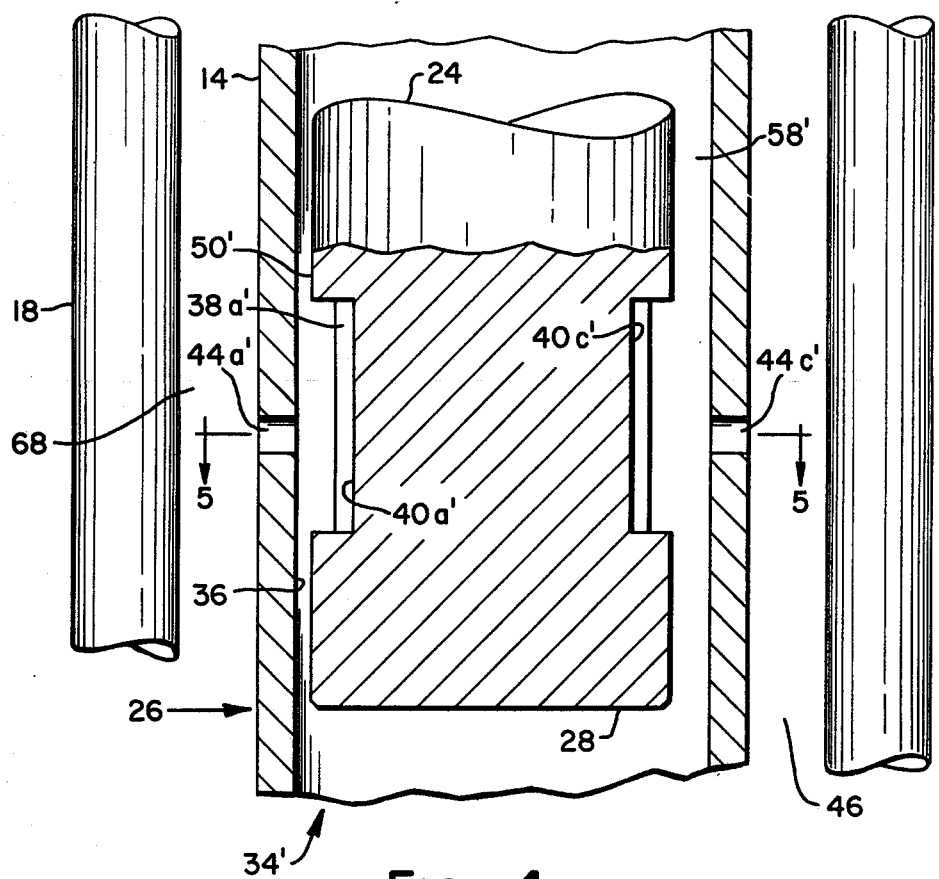
FIG. 4 is a sectioned elevation view of an alternate embodiment of the invention.
Figure 5:
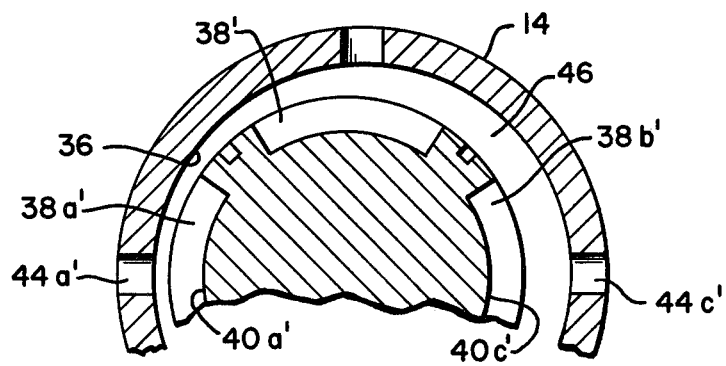
FIG. 5 is a sectioned view along the lines 5—5 of FIG. 4.

Referring now to FIGS. 4 and 5, an alternate embodiment of the bearing 34' is shown where the high-pressure liquid is introduced into the pockets 38' through the orifices 44' in the guide tube 14. Since the withdrawn position 26 of the control rod 24 is unique and repeatable, the orifices 44' can be located such that the pockets 38' will be adjacent to the orifices 44' when the rod is in the withdrawn position. As previously described, when the rod approaches contact with the guide tube wall 36, the pocket 38a' is nearly completely sealed such that the pressure drop between points 68 and 50' is taken almost entirely across the top of the pocket 50'. Thus the pressure in the pocket 38a' on the front wall 40a' is approximately equal to the pressure of the fluid flowing past the fuel element 18 outside the guide tube 14 at 68. It is to be understood that the coolant outside the guide tube 14 is flowing upward through the assembly 10 at a very rapid rate and even in the upper portion of the assembly 10, the pressure will usually be substantially higher than the pressure anywhere within the guide tube 14. Therefore the coolant outside the guide tube is an ideal pressure source.

On the other side of the rod tip, the pressure of the fluid at 58' is about the same as that at 50', but most of the pressure drop between the orifice 44c' and point 58' is taken across the orifice, resulting in substantially no contribution to static pressure on front wall 40c' due to the added flow from the orifice 44c'. As in the previous embodiment, the greater static pressure on the front wall 40a' than on front wall 40c' tends to keep the rod tip 28 away from the guide tube wall 36. In this embodiment of the invention a chamber is not needed so that the liquid flow rate in the annulus 46 is greater than in the first described embodiment.

What is claimed is:

1. In a nuclear reactor core having a liquid coolant pumped upward therethrough and a cylindrical control rod vertically reciprocable therein from a unique withdrawn position at the upper end of the core, the combination comprising:
    a control rod having a generally cylindrical bearing portion at its lower tip, the bearing including a plurality of discrete pockets circumferentially spaced around the outer surface thereof;
    a cylindrical guide tube through which the rod reciprocates, the tube having an upward flow of liquid passing between said pockets and the inner wall of said guide tube;
    means for additionally introducing a portion of said pumped liquid directly into each of the pockets at substantially equal flow when the rod is in said unique position;
    whereby when the rod tip approaches any inner surface of the tube, the distribution of static pressures in the pockets will tend to keep the rod tip off the guide tube.

2. The combination of claim 1, wherein said means for introducing liquid include a plurality of orifices circumferentially located through the guide tube at an elevation such that the orifices are opposite the pockets of the bearing when the rod is in the unique withdrawn position.

3. The combination of claim 1, wherein said means for introducing pumped liquid includes inner wall means within the bearing defining a downward facing chamber for trapping a portion of the liquid flowing upward through the tube, and further includes conduit means for maintaining fluid communication between the chamber and each of the pockets.

4. The invention of claim 2, wherein each of the pockets is surrounded by portions of the bearing conforming to the curvature of the guide tube inner surface.

5. The combination of claim 2, wherein the outer surface of the bearing having the pockets has an azimuthal perimeter defined by integrally formed, alternating segments having respectively larger and smaller outer diameters and wherein said pockets consist of the space between the segments having the larger diameters.

6. The combination of claim 2, wherein each of the pockets has a front wall facing the guide tube, the front wall having a larger area than the total cross section of the orifice opposite each respective front wall.

7. The combination of claim 5, further including longitudinal grooves extending through the larger diameter segments for providing an upward flow path whereby liquid may pass upward along the bearing adjacent to each pocket even when the pocket is effectively sealed against the guide tube inner wall.

8. A control rod to be vertically suspended within a guide tube, the tube having liquid flowing upward therethrough, comprising:
    a cylindrical control rod;
    a generally cylindrical hydraulic bearing forming the lower tip of the rod, the bearing including;
    inner wall means defining a downward-facing chamber for trapping a portion of the upward flowing liquid;
    outer wall means adapted to face the inside surface of the guide tube, the outer wall means defining a plurality of discrete pockets; and
    means for introducing liquid from the chamber into each of the pockets.

9. The control rod of claim 8, wherein the outer wall means surrounding each pocket has a curvature generally concentric with the guide tube.

10. The control rod of claim 8, wherein the means for transmitting pressure consists of at least one bore between the chamber and each pocket.

11. The control rod of claim 9, wherein the azimuthal perimeter of the outer wall means having the pockets is defined by integrally formed, alternating segments having respectively larger and smaller outer diameters, and wherein said pockets consist of the space between segments having the larger diameter.

12. The control rod of claim 10 or 11, wherein the portion of the bearing below the pockets forms a ring having an outer diameter equal to the outer diameter of the bearing above the pockets.

13. The control rod of claim 10, wherein the area of each pocket facing the guide tube surface is larger than the flow area of the respective bore entering each pocket.

14. The control rod of claim 12, further comprising means formed on the ring for restricting the upward flow of coolant between the ring and the tube inner surface, in order to increase the pressure in the chamber relative to the static pressure between the bearing and the tube inner surface.

15. The control rod of claim 12, wherein said larger outer diameter is equal to the outer diameter of the ring and of the poison section of the control rod.

16. The control rod of claim 11, further including longitudinal grooves extending through the larger diameter segments for providing an upward flow path whereby liquid may flow upward between pockets even when the pocket is effectively sealed against the guide tube wall.

* * * * *